(12) United States Patent
Lin

(10) Patent No.: US 11,507,180 B2
(45) Date of Patent: *Nov. 22, 2022

(54) METHODS AND SYSTEMS FOR ASSOCIATING INPUT SCHEMES WITH PHYSICAL WORLD OBJECTS

(71) Applicant: Rovi Guides, Inc., San Jose, CA (US)

(72) Inventor: Edison Lin, Menlo Park, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/169,799

(22) Filed: Feb. 8, 2021

(65) Prior Publication Data
US 2021/0240255 A1 Aug. 5, 2021

Related U.S. Application Data

(63) Continuation of application No. 16/149,478, filed on Oct. 2, 2018, now Pat. No. 10,948,975, which is a continuation of application No. 15/011,119, filed on Jan. 29, 2016, now Pat. No. 10,120,437.

(51) Int. Cl.
| | |
|---|---|
| *G06F 3/01* | (2006.01) |
| *G06F 3/16* | (2006.01) |
| *H04N 21/414* | (2011.01) |
| *H04N 21/4223* | (2011.01) |
| *H04N 21/45* | (2011.01) |
| *H04N 21/472* | (2011.01) |
| *H04N 21/475* | (2011.01) |
| *H04N 21/482* | (2011.01) |

(52) U.S. Cl.
CPC .............. *G06F 3/011* (2013.01); *G06F 3/017* (2013.01); *G06F 3/167* (2013.01); *H04N 21/41407* (2013.01); *H04N 21/4223* (2013.01); *H04N 21/4532* (2013.01); *H04N 21/4755* (2013.01); *H04N 21/47202* (2013.01); *H04N 21/4821* (2013.01)

(58) Field of Classification Search
CPC ........ G06F 3/011; G06F 3/017; G06F 3/0167; H04N 21/41407; H04N 21/4223; H04N 21/4532; H04N 21/47202; H04N 21/4755; H04N 21/4821
USPC .......................... 345/156, 419, 633; 382/224
See application file for complete search history.

(56) References Cited

U.S. PATENT DOCUMENTS

| | | | |
|---|---|---|---|
| 6,239,794 | B1 | 5/2001 | Yuen et al. |
| 6,564,378 | B1 | 5/2003 | Satterfield et al. |
| 7,165,098 | B1 | 1/2007 | Boyer et al. |
| 7,761,892 | B2 | 7/2010 | Ellis et al. |
| 7,827,239 | B2 | 11/2010 | Bodin et al. |
| 8,046,801 | B2 | 10/2011 | Ellis et al. |
| 8,953,889 | B1 | 2/2015 | Worley et al. |
| 9,742,492 | B2 | 8/2017 | Shatz et al. |
| 9,761,059 | B2 | 9/2017 | Nistel et al. |

(Continued)

*Primary Examiner* — Prabodh M Dharia
(74) *Attorney, Agent, or Firm* — Haley Guiliano LLP

(57) ABSTRACT

Methods and systems are described herein for a media guidance application that allows users to associate input schemes with physical objects in an augmented reality environment. Specifically, the media guidance application may recognize physical objects in an augmented reality environment and allow users to identify input schemes to associate with the physical objects, wherein the input schemes are ways in which users may control presentation of media content by interacting with the physical objects.

20 Claims, 7 Drawing Sheets

(56) References Cited

U.S. PATENT DOCUMENTS

| | | |
|---|---|---|
| 10,467,811 B1 | 11/2019 | Cederlof |
| 10,846,930 B2 * | 11/2020 | Miller .................. G06T 19/006 |
| 2002/0174430 A1 | 11/2002 | Ellis et al. |
| 2003/0195891 A1 | 10/2003 | Marsh |
| 2005/0240603 A1 | 10/2005 | Bodin et al. |
| 2005/0251827 A1 | 11/2005 | Ellis et al. |
| 2008/0104112 A1 | 5/2008 | Nicholl et al. |
| 2009/0300122 A1 | 12/2009 | Freer |
| 2010/0153885 A1 | 6/2010 | Yates |
| 2011/0209345 A1 | 9/2011 | Kurosawa et al. |
| 2011/0310227 A1 | 12/2011 | Konertz et al. |
| 2012/0025975 A1 * | 2/2012 | Richey .................. H04L 67/131 340/539.13 |
| 2012/0050185 A1 | 3/2012 | Davydov et al. |
| 2012/0194549 A1 | 8/2012 | Osterhout et al. |
| 2012/0221414 A1 | 8/2012 | Hetherington et al. |
| 2012/0249741 A1 | 10/2012 | Maciocci et al. |
| 2012/0260217 A1 | 10/2012 | Celebisoy |
| 2012/0306850 A1 | 12/2012 | Balan et al. |
| 2012/0330869 A1 | 12/2012 | Durham |
| 2013/0086077 A1 | 4/2013 | Piippo et al. |
| 2013/0110666 A1 | 5/2013 | Aubrey |
| 2013/0117377 A1 * | 5/2013 | Miller .................... G06F 3/013 709/205 |
| 2013/0290233 A1 | 10/2013 | Ferren et al. |
| 2013/0342573 A1 | 12/2013 | Leazenby et al. |
| 2014/0178029 A1 | 6/2014 | Raheman et al. |
| 2014/0281972 A1 | 9/2014 | Kramer et al. |
| 2014/0298217 A1 | 10/2014 | Lehtiniemi et al. |
| 2014/0310595 A1 * | 10/2014 | Acharya ............. G06F 3/04842 715/706 |
| 2015/0062004 A1 | 3/2015 | Rafii |
| 2015/0088518 A1 | 3/2015 | Kim et al. |
| 2015/0123966 A1 | 5/2015 | Newman |
| 2015/0193986 A1 * | 7/2015 | Nistel ..................... G06T 15/04 345/426 |
| 2015/0254793 A1 | 9/2015 | Hastings et al. |
| 2015/0331246 A1 | 11/2015 | Dewald et al. |
| 2016/0026253 A1 | 1/2016 | Bradski et al. |
| 2016/0048498 A1 | 2/2016 | Kim et al. |
| 2016/0070439 A1 | 3/2016 | Bostick et al. |
| 2016/0142783 A1 * | 5/2016 | Bagga .............. H04N 21/47214 725/47 |
| 2016/0195856 A1 | 7/2016 | Spero |
| 2016/0210602 A1 | 7/2016 | Siddique et al. |
| 2016/0232182 A1 | 8/2016 | Harris et al. |
| 2016/0247324 A1 | 8/2016 | Mullins et al. |
| 2016/0300392 A1 | 10/2016 | Jonczyk et al. |
| 2016/0314609 A1 | 10/2016 | Taylor et al. |
| 2017/0100662 A1 * | 4/2017 | Scott ...................... A63F 13/69 |
| 2017/0103452 A1 | 4/2017 | Hertel et al. |
| 2017/0124772 A1 | 5/2017 | Baszucki et al. |
| 2017/0195644 A1 | 7/2017 | Shatz et al. |
| 2017/0221265 A1 | 8/2017 | Lin |
| 2017/0228036 A1 | 8/2017 | Klein et al. |
| 2017/0236337 A1 | 8/2017 | Devries |
| 2017/0272552 A1 | 9/2017 | Zhou et al. |
| 2017/0352187 A1 | 12/2017 | Haines |
| 2018/0060430 A1 | 3/2018 | Lu |
| 2018/0264365 A1 | 9/2018 | Soederberg et al. |

* cited by examiner

1000

1000 ...
1001 Initialization Subroutine
1002 ...
1003 //Routine to identify a physical object in an augmented reality environment:
1004
1005 Analyze image/video frame to store a digital description of each physical object in the image/video frame
1006 For each digital description of a physical object:
1007 Query database containing a history of values of digital descriptions of physical objects for entries matching the digital description
1008 If (number of matching entries>0 OR Number of similar entries>0)
1009 Retrieve value of media assets from database entries matching the digital description
1010 Execute subroutine to automatically present the media assets corresponding to the digital description of the physical object using control circuitry
1011 ...
1012 Termination Subroutine
1013 ...

FIG. 10

METHODS AND SYSTEMS FOR ASSOCIATING INPUT SCHEMES WITH PHYSICAL WORLD OBJECTS

CROSS-REFERENCE TO RELATED APPLICATIONS

This application is a continuation of U.S. patent application Ser. No. 16/149,478, filed Oct. 2, 2018, which is a continuation of U.S. patent application Ser. No. 15/011,119, filed Jan. 29, 2016, now U.S. Pat. No. 10,120,437, the disclosures of which are hereby incorporated by reference herein in their entireties.

BACKGROUND

In conventional systems, users access media content by browsing or searching a digital library of media assets. Unfortunately, this way of locating media content is not inherently intuitive and does not correspond to how users organize physical objects in the physical world.

SUMMARY

Accordingly, methods and systems are described herein for a media guidance application that solves the aforementioned problems by allowing users to associate media assets with physical objects in an intuitive fashion. Specifically, the media guidance application may recognize physical objects in an augmented reality environment and allow users to identify media assets to associate with the physical objects. After associating the media asset with the physical object, the media guidance application may automatically present the media asset to the user when the physical object is detected in the user's augmented reality environment. This association of media assets to physical objects allows users to quickly and easily access music, videos, or other media content that correspond to their surroundings, improving the users' overall experiences. For example, boring and difficult tasks may become less draining when appropriate songs automatically play and keep users interested and motivated. Moreover, users may not need to endlessly look through large digital playlists or divert their attention to a hand-held device to access desired media content.

Accordingly, the media guidance application may associate a media asset with a physical object, and automatically present the media asset when the physical object is detected thereafter. For example, a user may enter an exercise room with many objects, including an exercise bike. The media guidance application may recognize the objects in the exercise room through a camera on the user's augmented reality headset. For example, the media guidance application may recognize the exercise bike through the camera, when the user enters the exercise room. The media guidance application may receive a user input from the user identifying a workout song to associate with the exercise bike. After associating the workout song with the exercise bike, the media guidance application may automatically present the workout song to the user when an exercise bike is detected in the user's augmented reality environment. In another example, the user may associate an input scheme with a water bottle. For example, the user may wish to control the music when he or she is taking a break from exercising by pausing the music while drinking water from the water bottle.

In another example, users may identify input schemes to associate with the physical objects, wherein the input schemes are ways in which users may control presentation of media content. After associating the input scheme with the physical object, the user may control the presentation of media content by interacting with the physical object. This provides users with a plethora of ways to control the media content they are viewing, since there may be a different input scheme for each physical object and for each way a user can interact with the physical object. In addition, the input schemes allow users to control media content naturally and intuitively by interacting with physical objects instead of devices.

In some aspects, the media guidance application may associate media content with physical world objects. The media guidance application may store a digital description of a physical object in an augmented reality environment of a user. For example, the media guidance application may detect an exercise bike in a user's augmented reality environment via a camera in the user's augmented reality headset. For example, the media guidance application may store a digital representation of an image of the exercise bike in memory.

The media guidance application may receive a user input from the user, assigning a media asset to the physical object. For example, the user may identify a workout song "Pump Up" to be associated with the exercise bike.

After receiving the user input assigning the media asset to the physical object, the media guidance application may detect the physical object in the augmented reality environment by comparing digital descriptions of physical objects in the augmented reality environment to the digital description of the physical object. For example, the media guidance application may detect the exercise bike when it is present in the user's augmented reality environment by comparing digital descriptions of images of physical objects in the user's augmented reality with the stored digital description of the exercise bike.

In response to detecting the physical object in the augmented reality environment, the media guidance application may automatically cause the media asset to be presented. For example, in response to detecting the exercise bike in the user's augmented reality environment, the media guidance application may automatically cause the workout song "Pump Up" to be presented to the user.

In some embodiments, the digital description of the physical object may be created using image segmentation and edge detection on an image of the physical object. For example, the digital description of the exercise bike may be created by applying image segmentation and edge detection to an image of the exercise bike.

In some embodiments, the digital description of the physical object may be created using blob detection on an image of the physical object. For example, a digital description of an exercise bike may be created by determining different properties (e.g., brightness) between a region constituting an exercise bike and a region constituting the room.

In some embodiments, the digital description of the physical object may be an alphanumeric value describing the shape and color of the physical object. For example, the digital description of the exercise bike may be an alphanumeric value.

In some embodiments, the augmented reality environment may be a real-world physical environment supplemented by computer-generated sensory inputs. For example, the augmented reality environment may be an exercise room with overlaid graphics and audio. For example, the user may perceive the augmented reality environment through a see-through display, which overlays graphics over the real world.

In some embodiments, the user initially identifies the physical object by performing a hand gesture over the physical object. For example, the user may point to the exercise bike, identifying it to the media guidance application.

In some embodiments, the user input assigning the media asset to the physical object may be a voice input identifying the media asset. For example, the user may say, "Pump Up song," identifying the workout song "Pump Up" to be associated with the exercise bike.

In some embodiments, the user input assigning the media asset to the physical object may include hand gestures navigating to the media asset. For example, users may navigate media asset libraries presented in the augmented reality environments by waving their hands and pointing to the media asset listings they desire.

In some embodiments, the media guidance application may store a digital description of a physical object in the augmented reality environment by creating an object identifier associated with the physical object. For example, the media guidance application may create a unique identifier for a physical object and associate the identifier with the digital description of the physical object. The media guidance application may store the object identifier and the digital description in a first database listing object identifiers, each corresponding to a digital description. For example, the media guidance application may store an identifier identifying the exercise bike and the digital description of the exercise bike in a first database. In some embodiments, the media guidance application may store a media asset identifier associated with the media asset and the object identifier in a second database listing object identifiers, each corresponding to a media asset. For example, the media guidance application may store a media asset identifier identifying the workout song "Pump Up" and the object identifier identifying the exercise bike in a second database.

In some aspects, the media guidance application may allow users to control presentation of media content with physical world objects. The media guidance application may store a digital description of a physical object in an augmented reality environment of a user. For example, the media guidance application may detect an exercise bike in a user's augmented reality environment via a camera in the user's augmented reality headset. For example, the media guidance application may store a digital representation of an image of the exercise bike in memory.

The media guidance application may receive a user input from the user, assigning an input scheme for controlling presentation of media content to the physical object. For example, the user may identify an input scheme to control the volume of media content to be associated with the exercise bike. For example, the volume of the media content may be increased when the peddles on the exercise bike rotate faster and decreased when the peddles on the exercise bike rotate slower.

After receiving the user input assigning the input scheme for controlling presentation of media content to the physical object, the media guidance application may detect the physical object in the augmented reality environment by comparing digital descriptions of physical objects in the augmented reality environment to the digital description of the first object. For example, the media guidance application may detect the exercise bike when it is present in the user's augmented reality environment by comparing descriptions of images of physical objects in the user's augmented reality with the stored digital description of the exercise bike.

In response to detecting the physical object in the augmented reality environment, the media guidance application may control presentation of media content using the input scheme. For example, the user may control the volume of the media content by peddling faster to increase the volume and peddling slower to decrease the volume.

In some embodiments, the user input assigning an input scheme for controlling presentation of media content to the physical object is a combination of a voice input identifying an attribute of the presentation of media content to be controlled and a gesture input identifying the interaction with the physical object that controls the attribute. For example, the user may say, "volume," indicating a desire to control the volume of the media content and may peddle to indicate a desire to control the volume by peddling.

In some embodiments, the input scheme for controlling presentation of media content is one of a plurality of predefined input schemes, each associated with a physical object. For example, the media guidance application may allow the user to select a predefined input scheme. For example, an input scheme for controlling the volume using an exercise bike may be predefined and the user may select it.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 10 is an illustrative example of pseudocode for identifying a physical object in an augmented reality environment in accordance with some embodiments of the disclosure.

DETAILED DESCRIPTION OF THE DRAWINGS

Figure 1:
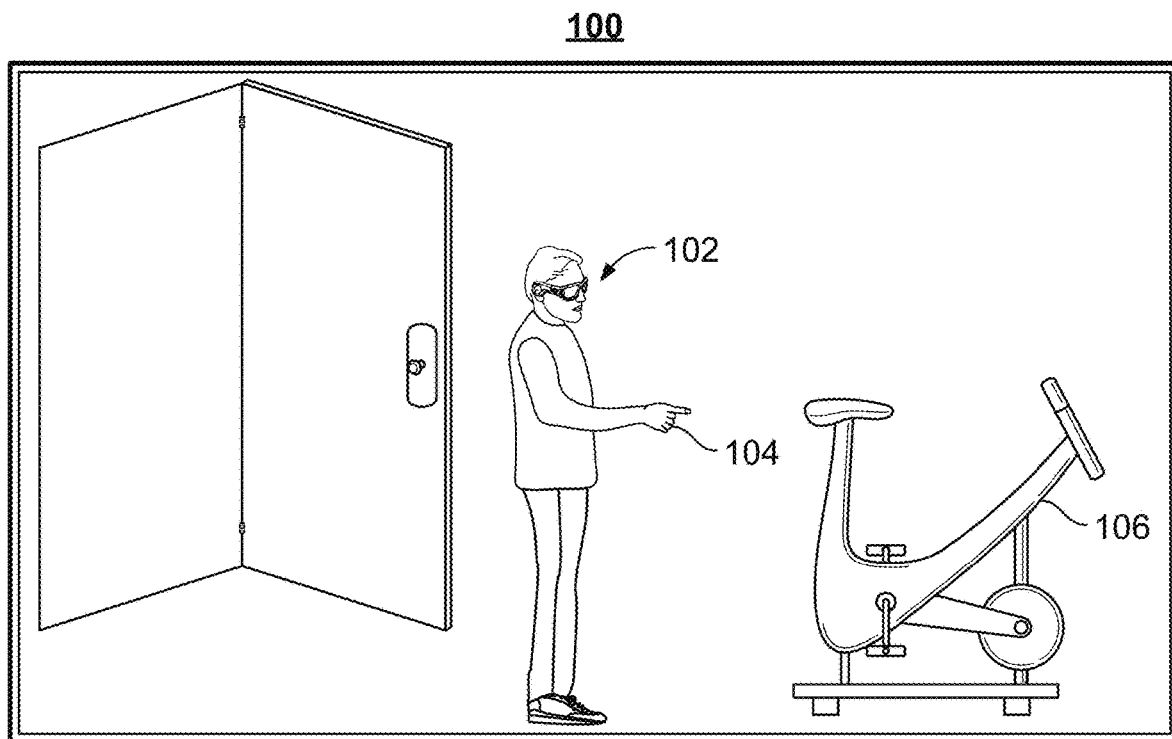
FIG. 1 shows an illustrative example of a user associating media content with a physical object in an augmented reality environment in accordance with some embodiments of the disclosure.

Methods and systems are described herein for a media guidance application that allows users to associate media assets with physical objects in an augmented reality environment. Specifically, the media guidance application may recognize physical objects in an augmented reality environment and allow users to identify media assets to associate with the physical objects. Moreover, users may identify input schemes to associate with the physical objects, wherein the input schemes are ways in which users may control presentation of media content.

For example, the media guidance application may recognize a physical object in a user's augmented reality environment and allow the user to associate a media asset with the physical object. After associating the media asset with the physical object, the media guidance application may automatically present the media asset to the user when the physical object is detected in the user's augmented reality environment. For example, by associating media assets with physical objects, the media guidance application may automatically present users with the media assets they desire while the users are in the appropriate augmented reality environment. In another example, the media guidance application may recognize a physical object in a user's augmented reality environment and allow the user to associate an input scheme with the physical object. After associating the input scheme with the physical object, the user may control the presentation of media content by using the physical object as a controller.

Accordingly, the media guidance application may associate a media asset with a physical object, and automatically present the media asset when the physical object is detected thereafter. For example, the media guidance application may recognize an exercise bike in a user's augmented reality environment, when the user enters an exercise room. The media guidance application may receive a user input from the user identifying a workout song to associate with the exercise bike. After associating the workout song with the exercise bike, the media guidance application may automatically present the workout song to the user when an exercise bike is detected in the user's augmented reality environment. In another example, the user may associate an input scheme with the exercise bike. For example, the user may wish to control the volume of the music he or she is listening to by peddling faster to increase the volume and peddling slower to decrease the volume.

As referred to herein, the term "physical object" refers to any object that exists in the real physical world. For example, a physical object may be an object in a user's physical environment. For example, a physical object may be an exercise bike, a yoga mat, or a pair of dumbbells.

As referred to herein, the term "computer-generated sensory input" refers to any sensory input that has been created in whole or in part with the aid of computer software or hardware. For example, a computer-generated sensory input may be a sound, video, or graphic that is created by a computer. For example, a computer-generated sensory input may be a menu that is displayed by a computer (e.g., menu 202 (FIG. 2)).

As referred to herein, the term "augmented reality environment" refers to a live real-world environment that is augmented by a computer-generated sensory input. For example, an augmented reality environment may be a live real-world environment with computer-generated graphics, computer-generated audio, or computer-generated video overlaid on the real-world environment. For example, an augmented reality environment may be a real exercise room that is seen through a see-through display, on which digital graphics can be presented and overlaid on the physical world. In another example, an augmented reality environment may be a display with a live video stream of a real-world environment overlaid with graphics, audio, or video. For example, a user may perceive the augmented reality environment on a mobile device that uses a camera input to display the user's environment and overlays a video over the camera input.

As referred to herein, the term "digital description" refers to a digital representation of physical objects. For example, a digital description may be a textual description describing details of the object in words, a mathematical description describing the object's shape, size, and/or color, or a combination. For example, the digital description of an exercise bike may be vectors defining the edges in an image of the bike. In another example, the digital description may include the color, shape, and size of the exercise bike.

As referred to herein, the term "input scheme" is an association between a way to input data and controlling an attribute. For example, an input scheme may be an action or motion used to control presentation of media content. For example, an input scheme may include unrolling a yoga mat as a way to input data, and playback speed of media content as the attribute to be controlled by unrolling the yoga mat. In another example, an input scheme may include peddling an exercise bike as the way to input data, and volume of media content as the attribute to be controlled by peddling.

As referred to herein, the term "object identifier" is anything that identifies a physical object. For example, an identifier may be a name, a description, or a digital representation of a physical object. For example, an object identifier may be a string, number, or a combination of both. An object identifier may identify a single physical object, such as a sculpture or a work of art, or an object identifier may identify a group of similar objects, such as different exercise bikes. For example, an object identifier of an exercise bike may be a unique identifier identifying exercise bikes. For example, the object identifier of the exercise bike may be the string "exercise bike." An object identifier may be distinct for similar objects of different brands. For example, the object identifier of an exercise bike of brand A may be different from the object identifier of an exercise bike of brand B. In another example, the object identifier may be a unique alphanumeric value generated for each new object that is detected.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1 shows an illustrative example of a user associating media content with a physical object in an augmented reality environment. The user in FIG. 1 is wearing an augmented reality headset 102 that allows the user to perceive the augmented reality environment through a see-through display. The augmented reality headset 102 also includes a camera from which the media guidance application may get a video stream of the user's environment to detect objects. The media guidance application may continuously detect all objects in the video stream of the user's environment. When the user enters the exercise room and looks at an exercise bike 106 with the augmented reality headset, the media guidance application detects the exercise bike 106. The user points at the exercise bike 106. When the media guidance application detects the user's hand pointing at the exercise bike 106, it stores a digital description of the exercise bike 106. In some embodiments, the media guidance application stores digital descriptions for all objects it detects in the video stream of the user's environment. In some embodiments, the media guidance application may store the digital description in storage (e.g., storage 508 (FIG. 5)) on the device local to the user. In some embodiments, the media guidance application may store the digital description in storage on a server (e.g., media guidance data source 618 (FIG. 6)).

Figure 2:
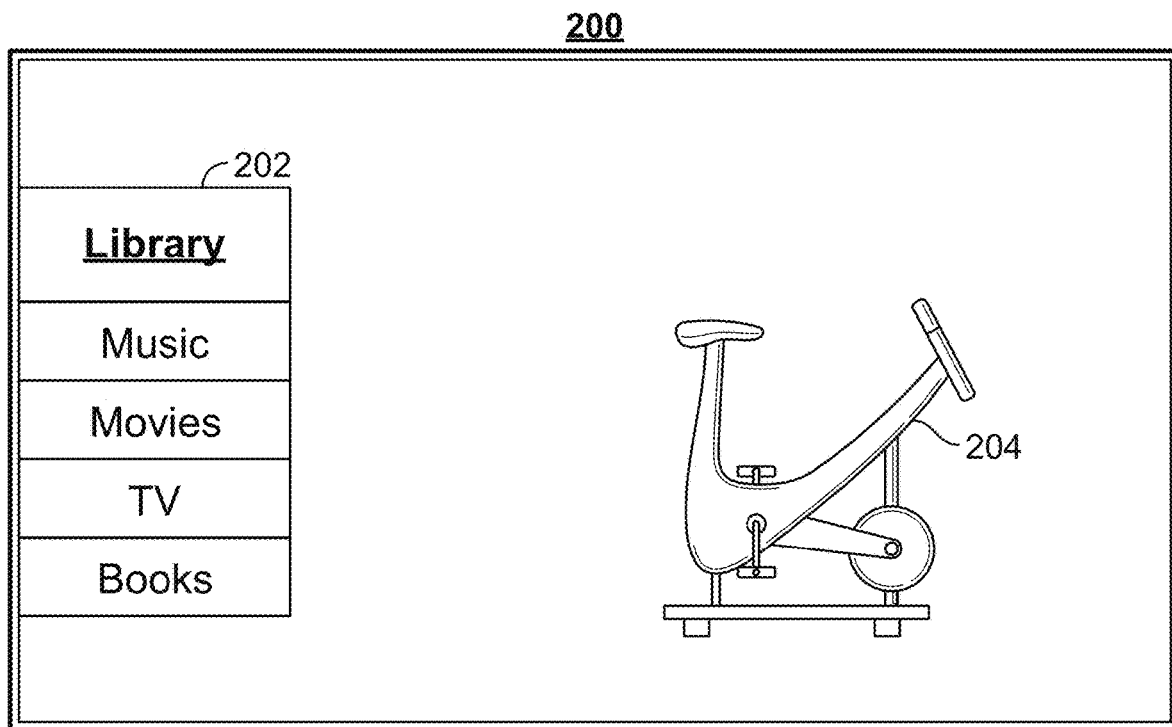
FIG. 2 shows an illustrative example of an augmented reality environment in accordance with some embodiments of the disclosure.

FIG. 2 shows an illustrative display that may be used to provide media guidance in an augmented reality environment. Display 200 is an example of what the user in FIG. 1 sees through the augmented reality headset after the user points to the exercise bike and the media guidance application stores a digital description of the exercise bike. The user sees physical objects such as the exercise bike 204 as well as computer-generated sensory inputs such as the overlaid digital menu 202. The overlaid digital menu allows the user to choose media content like music, movies, books, etc. In some embodiments, the augmented reality environment includes a headset, and the user may identify a media asset by pointing to where the media asset appears in the augmented reality environment. For example, a user may point at the area on which a media asset in the digital menu is overlaid. In some embodiments, the user may identify a media asset by navigating to it and selecting it, using a user input device such as a remote. For example, the augmented reality environment may include a mobile device displaying a live video stream of the real-world environment overlaid with graphics, audio, and/or video on the display. The user may identify a media asset by selecting it, using the inputs of the mobile device. For example, the user may touch the media asset to select it.

Figure 3:
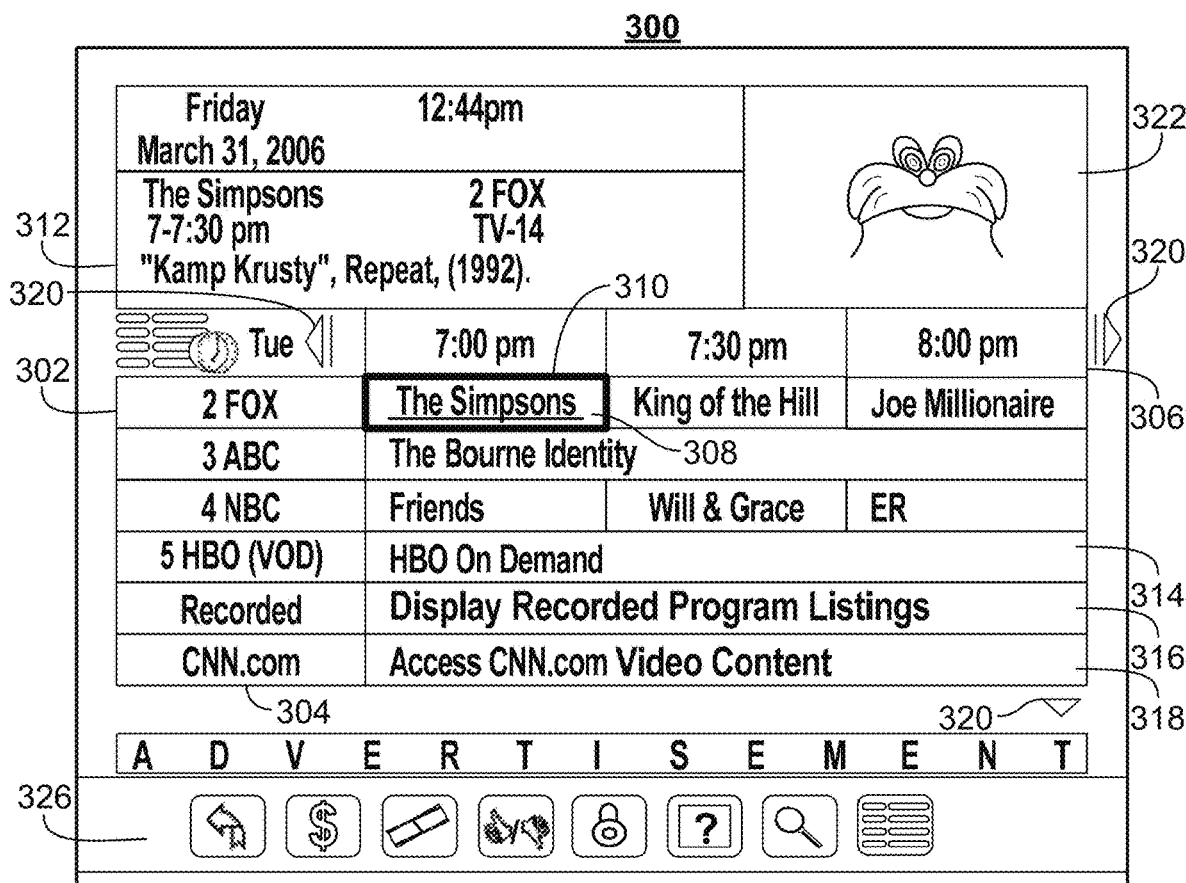
FIG. 3 shows an illustrative media listing display in accordance with some embodiments of the disclosure.
Figure 4:
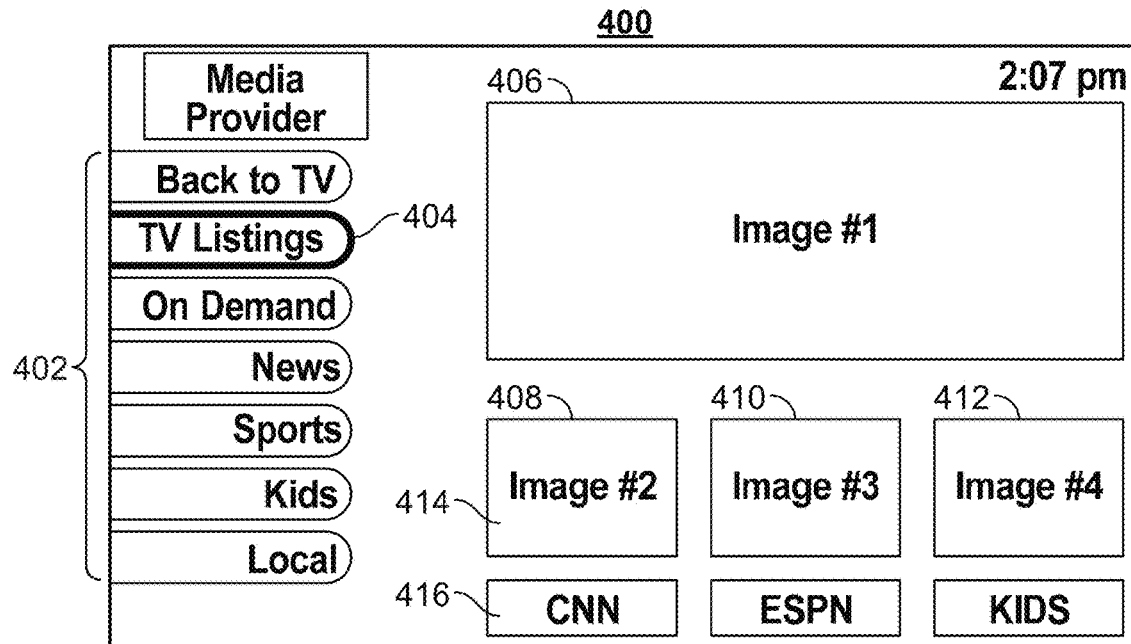
FIG. 4 shows another illustrative media listing display in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with:

(1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
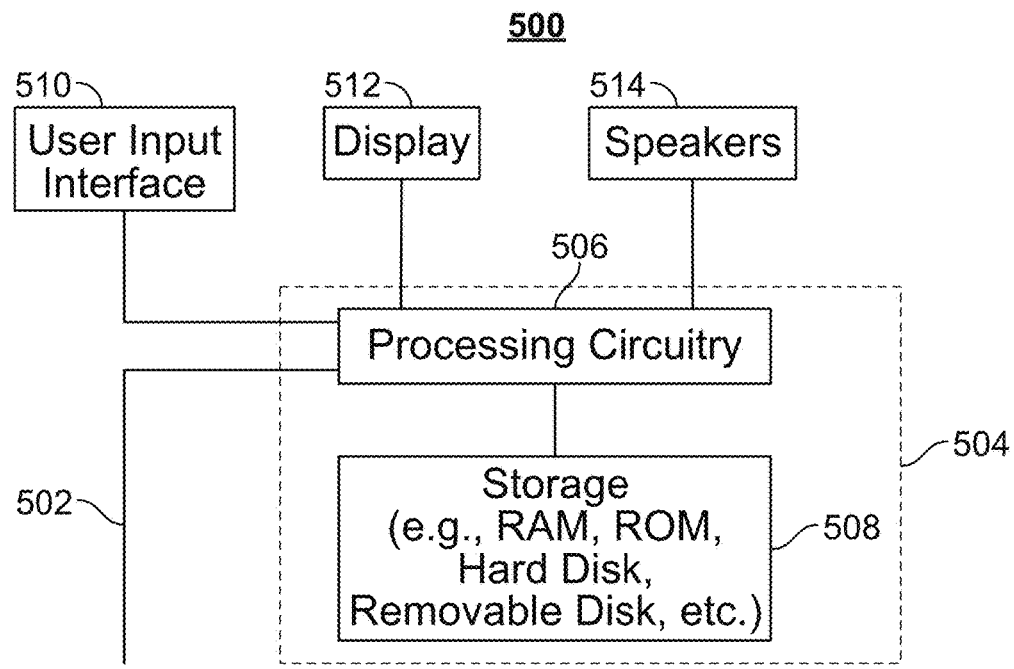
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, camera, motion detector, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a see-through display, a heads-up display, a transparent display, a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
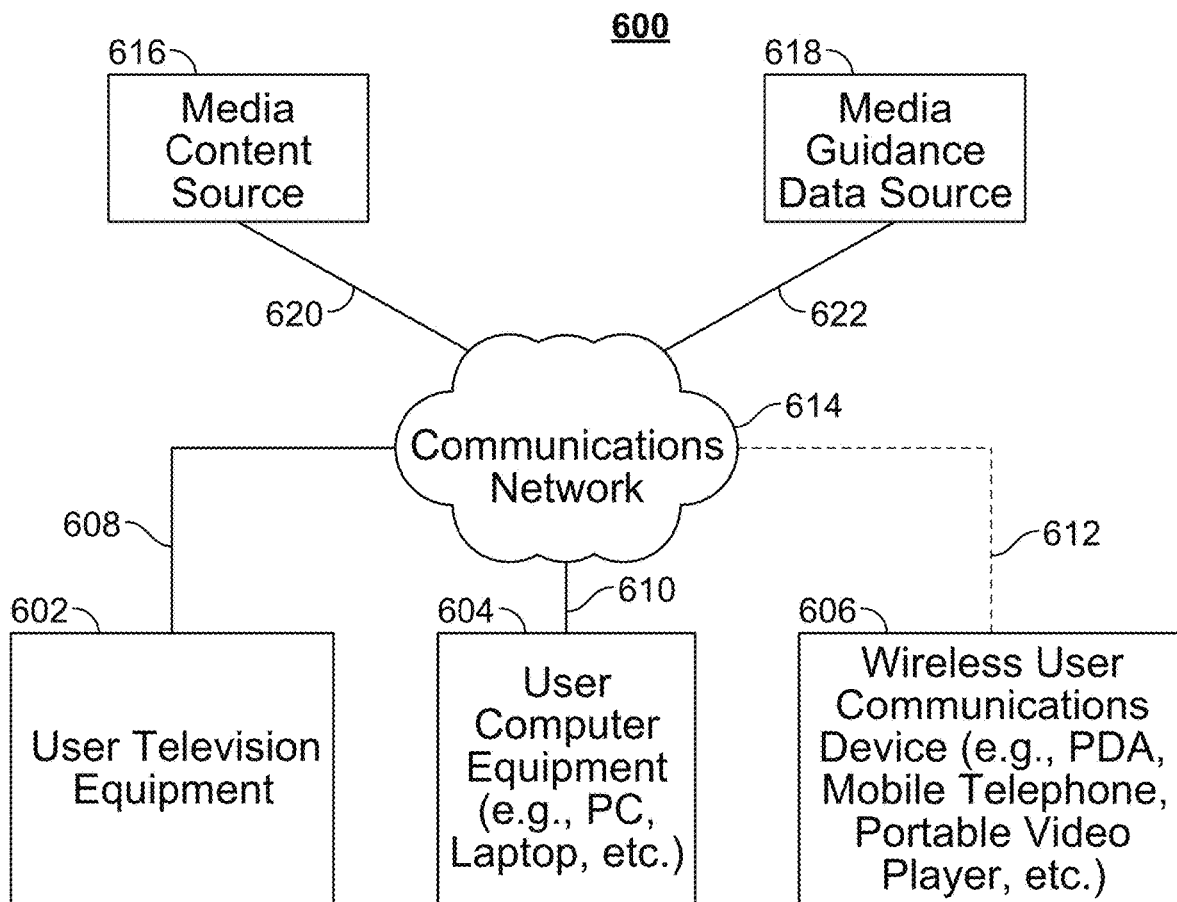
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be a wearable electronic device. As referred to herein, a "wearable electronic device" is any clothing or accessory that incorporates computer hardware. For example, wearable electronic devices may be computer glasses, smart watches, or any other clothing or accessory with embedded circuitry. For example, a wearable electronic device may be an augmented reality headset as glasses with a see-through display in the lenses and a camera on the frame.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired).

Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612.

Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

Figure 7:
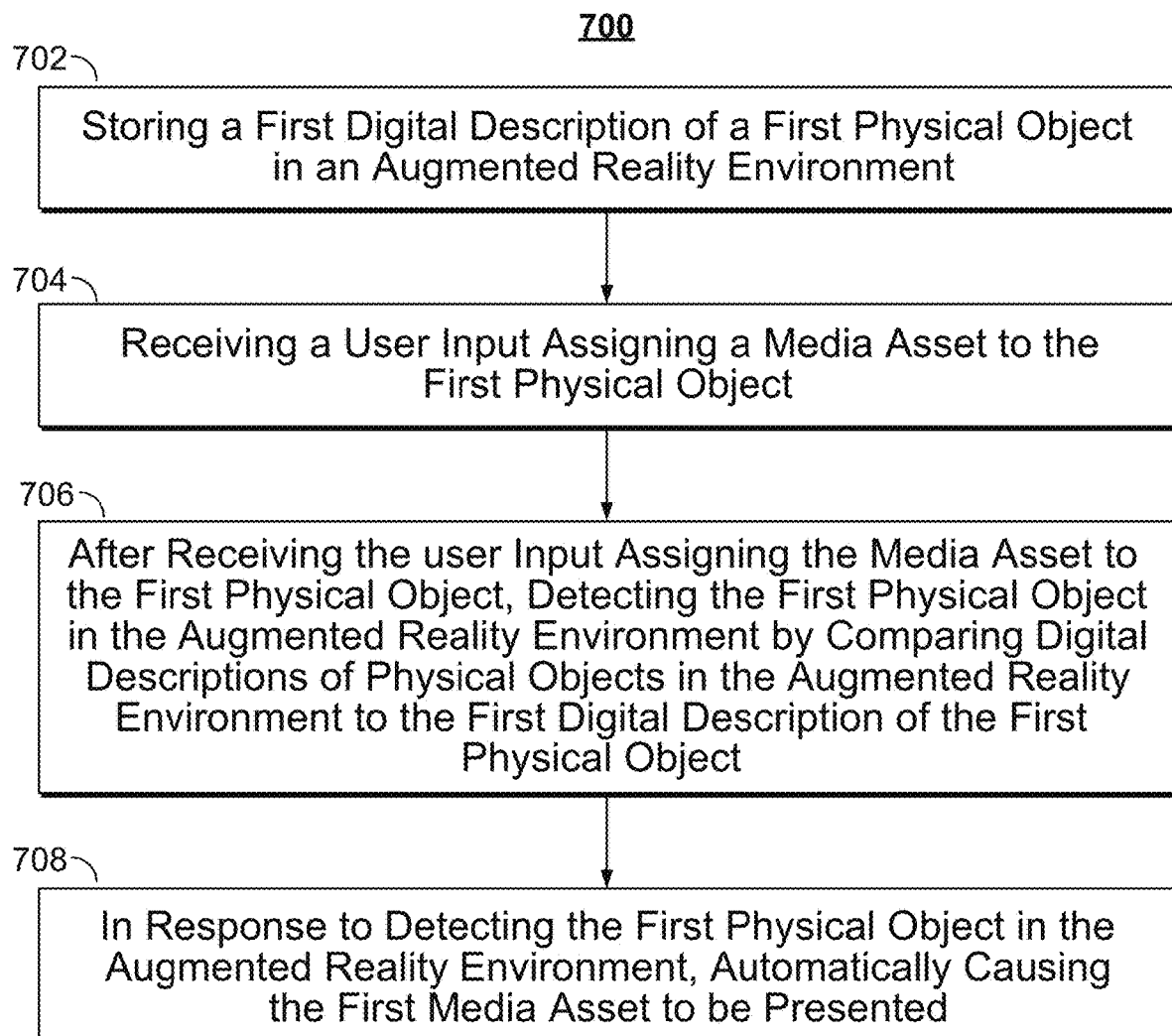
FIG. 7 is a flowchart of illustrative steps for associating a media asset with a physical object and automatically presenting the media asset when the physical object is detected in accordance with some embodiments of the disclosure.

FIG. 7 is a flowchart of illustrative steps for associating a media asset with a physical object and automatically presenting the media asset when the physical object is detected. It should be noted that process 700, or any step thereof, could occur on, or be provided by, any of the devices shown in FIGS. 5-6. For example, process 700 may be executed by control circuitry 504 (FIG. 5) as instructed by the media guidance application (e.g., implemented on any of the devices shown and described in FIG. 6).

In step 702, the media guidance application stores (e.g., in storage 508 (FIG. 5)) a digital description of a physical object (e.g., exercise bike 106 (FIG. 1)) in an augmented reality environment of a user. For example, the media guidance application may detect (e.g., using control circuitry 506 (FIG. 5)) an exercise bike in a user's augmented reality environment via a camera in the user's augmented reality headset (e.g., headset 106 (FIG. 1)). For example, the media guidance application may store a digital representation of an image of the exercise bike in memory.

In step 704, the media guidance application receives (e.g., using control circuitry 506 (FIG. 5)) a user input from the user, assigning a media asset to the physical object (e.g., exercise bike 106 (FIG. 1)). For example, the user may identify a workout song "Pump Up" to be associated with the exercise bike. For example, the media guidance application may present a digital menu on the display of the user's augmented reality headset, and the user may interact with the digital menu using hand gestures to associate "Pump Up" with the exercise bike. For example, the user may move a hand upwards to indicate a desire to scroll up in the menu. For example, the user may point at the area on which a media asset in the digital menu is overlaid.

In step 706, the media guidance application may, after receiving the user input assigning the media asset to the physical object, detect (e.g., using control circuitry 506 (FIG. 5)) the physical object in the augmented reality environment by comparing digital descriptions of physical objects in the augmented reality environment to the digital description of the physical object. For example, the media guidance application may detect the exercise bike when it is present in the user's augmented reality environment by comparing descriptions of images of physical objects in the user's augmented reality with the stored digital description of the exercise bike.

In step 708, the media guidance application, in response to detecting the physical object in the augmented reality environment, automatically causes (e.g., using control circuitry 506 (FIG. 5)) the media asset to be presented. For example, in response to detecting the exercise bike in the user's augmented reality environment, the media guidance application may automatically cause the workout song "Pump Up" to be presented to the user.

In some embodiments, the media guidance application may analyze each video frame of the user's live real-world environment from a camera to create a digital description of the physical object. For example, the media guidance application may analyze each video frame of the user's environment from a camera on the user's headset.

In some embodiments, the digital description of the physical object may be created using image segmentation and edge detection on an image of the physical object. For example, the digital description of the exercise bike may be created by applying image segmentation and edge detection to an image of the exercise bike. The media guidance application may partition each video frame into image segments based on characteristics such as color, intensity, and texture. For example, the media guidance application may analyze a video frame including the exercise bike and may partition the frame to an image segment that includes only the exercise bike.

The media guidance application may apply edge detection to the image segments to identify edges of the object in each of the image segments. For example, the media guidance application may determine the points in the image segments at which brightness of pixels change drastically to determine edges of objects in the image segments. For example, the media guidance application may determine edges of the exercise bike in the image segment. The media guidance application may create the digital description of the object using the edges.

In some embodiments, the digital description of the physical object may be created using blob detection on an image of the physical object. For example, the digital description of the exercise bike may be created by applying blob detection to an image of the exercise bike. For example, the media guidance application may determine regions in the video frame, wherein a region has approximately constant characteristics throughout and two neighboring regions have different characteristics. The media guidance application may create the digital description of the object using the determined regions.

In some embodiments, the digital description of the physical object may be an alphanumeric value describing the shape and color of the physical object. For example, the digital description of the exercise bike may be an alphanumeric value.

In some embodiments, the media guidance application may analyze video frames intermittently (e.g., one every certain period of time or one every certain number of frames).

In some embodiments, the augmented reality environment may be a real-world physical environment supplemented by computer-generated sensory inputs. For example, the augmented reality environment may be an exercise room with overlaid graphics and audio. For example, the user may perceive the augmented reality environment through a see-through display, which overlays graphics over the real world.

In some embodiments, the user initially identifies the physical object by performing a hand gesture over the physical object. For example, the user may point to the exercise bike, identifying it to the media guidance application.

In some embodiments, the user input assigning the media asset to the physical object may be a voice input identifying the media asset. For example, the user may say, "Pump Up song," identifying the workout song "Pump Up" to be associated with the exercise bike.

In some embodiments, the user input assigning the media asset to the physical object may include hand gestures navigating to the media asset. For example, users may navigate media asset libraries presented in the augmented reality environments by waving their hands and pointing to the media asset listings they desire.

In some embodiments, the media guidance application may change the association of a media asset with a first physical object to an association of the media asset with a second physical object. For example, a user may associate a workout song with an exercise bike and then may wish to associate the workout song with a yoga mat instead. The media guidance application may receive a first user input identifying a first physical object. For example, the user may point to the exercise bike and the media guidance application may detect the user pointing to the exercise bike through a camera. The media guidance application may receive a second user input identifying a second physical object. For example, the user may point to the yoga mat after pointing to the exercise bike. The media guidance application may, in response to receiving the second user input, change an association of a first media asset with the first physical object to an association of the first media asset with the second physical object. For example, the media guidance application may, in response to receiving the user inputs, associate media content that was originally associated with the exercise bike with the yoga mat instead. In some embodiments, the first and second user input may be one continuous input. For example, the user may drag media content from the first physical object to the second physical object. For example, the user may point at the exercise bike and then move his hand to point at the yoga mat and the media guidance application may detect the motion of the user's hand from pointing at the first physical object to pointing at the second physical object.

In some embodiments, the media guidance application may store a digital description of a physical object in the augmented reality environment by creating an object identifier associated with the physical object. For example, the media guidance application may create a unique identifier for a physical object and associate the identifier with the digital description of the physical object.

The media guidance application may store the object identifier and the digital description in a first database listing object identifiers, each corresponding to a digital description. For example, the media guidance application may store an identifier identifying the exercise bike and the digital description of the exercise bike in a first database.

In some embodiments, the media guidance application may store a media asset identifier associated with the media asset and the object identifier in a second database listing object identifiers, each corresponding to a media asset. For example, the media guidance application may store a media asset identifier identifying the workout song "Pump Up" and the object identifier identifying the exercise bike in a second database.

In some embodiments, the media guidance application may associate a plurality of media assets with a physical object. For example, the media guidance application may associate a playlist of workout songs with an exercise bike. In some embodiments, the media guidance application stores a plurality of media asset identifiers associated with media assets and a corresponding object identifier in a database listing object identifiers. For example, the media guidance application may store, in a database, media asset identifiers identifying media assets in the playlist of workout songs and an object identifier identifying the exercise bike. The media guidance application may automatically cause media assets corresponding to the media asset identifiers to be presented when the physical object is detected in the augmented reality environment. For example, the media guidance application may automatically play the playlist of workout songs when an exercise bike is detected in the augmented reality environment.

In some embodiments, the media guidance application may determine a rule associated with the plurality of media assets that is associated with a physical object. For example, the media guidance application may determine that all of the media assets associated with an exercise bike are workout songs. The media guidance application may determine whether a second media asset applies to the rule. For example, a new workout song may become available and the media guidance application may determine whether the new song should be associated with the exercise bike. The media guidance application may, in response to determining that the second media asset applies to the rule, automatically add the second media asset to the plurality of media assets associated with the physical object. For example, the media guidance application may add the new song to the media assets associated with the exercise bike.

In some embodiments, the media guidance application may associate a media asset with a plurality of physical objects. For example, the media guidance application may associate a workout song with both a pair of dumbbells and a kettle ball. The media guidance application may present the media asset associated with the plurality of physical objects only when the plurality of physical objects is detected. For example, the workout song may only play when the user sees both the pair of dumbbells and the kettle ball. For example, the workout song may not play when the user only sees the pair of dumbbells and not the kettle ball. In some embodiments, the media guidance application may present the media asset when the number of detected physical objects of the plurality of physical objects is greater than a threshold. For example, the user may associate a movie with ten physical objects in the user's living room and the media guidance application may play the movie if at least five of the ten physical objects are detected. This provides the benefit of allowing users to create subsets of media content by associating certain media assets with a physical object and associating different media assets with a plurality of physical objects including the physical object. This also provides the benefit of allowing the users to control access to media content, since users can come up with combinations of physical objects that would not normally be together. For example, a user may associate violent movies that are unsuitable for children with the Moon and a beer bottle and the media guidance application may only present the violent movies when both the Moon and the beer bottle are detected. This also provides the benefit of decreasing inadvertent access to media content.

In some embodiments, the media guidance application may associate the media asset with a user action involving the physical object. For example, the media guidance application may associate the workout song "Pump Up" with the unrolling of a yoga mat. For example, the media guidance application may store a digital description of a yoga mat unrolling, and may associate the digital description with the media asset.

The media guidance application may receive a first user input, identifying an action as a trigger. For example, the user may identify lifting dumbbells as a trigger. The media guidance application may store a digital description of the action. For example, the media guidance application may store a digital description of a video of dumbbells being lifted.

The media guidance application may receive a second user input, identifying a media asset to associate with the trigger. For example, the user may say, "Pump Up song," identifying the workout song "Pump Up," to be associated with lifting dumbbells.

The media guidance application may detect the trigger, by comparing digital descriptions of actions in the user's augmented reality environment to the digital description of the trigger. For example, the media guidance application may detect that the user is lifting dumbbells. In response to detecting the trigger, the media guidance application may automatically present the media asset to the user. For example, when the media guidance application detects the user is lifting dumbbells, the media guidance application may automatically play the workout song "Pump Up."

In some embodiments, the media guidance application may associate a media asset with a location. For example, the media guidance application may associate the workout song "Pump Up" with an exercise room. The media guidance application may store a digital description of a location. For example, the media guidance application may store the Global Position System ("GPS") coordinates as the digital description for the exercise room. In another example, the media guidance application may store a digital description of all the objects (e.g., exercise bike) in the user's augmented reality environment as the digital description of the exercise room.

In some embodiments, the media guidance application may associate a category of media assets with a physical object in an augmented reality environment. For example, the media guidance application may associate workout videos with an exercise bike. The media guidance application may receive a user input identifying the category of media assets to be associated with the physical object. For example, the user may look at an exercise bike and say "workout videos" to associate workout videos with the exercise bike.

Figure 8:
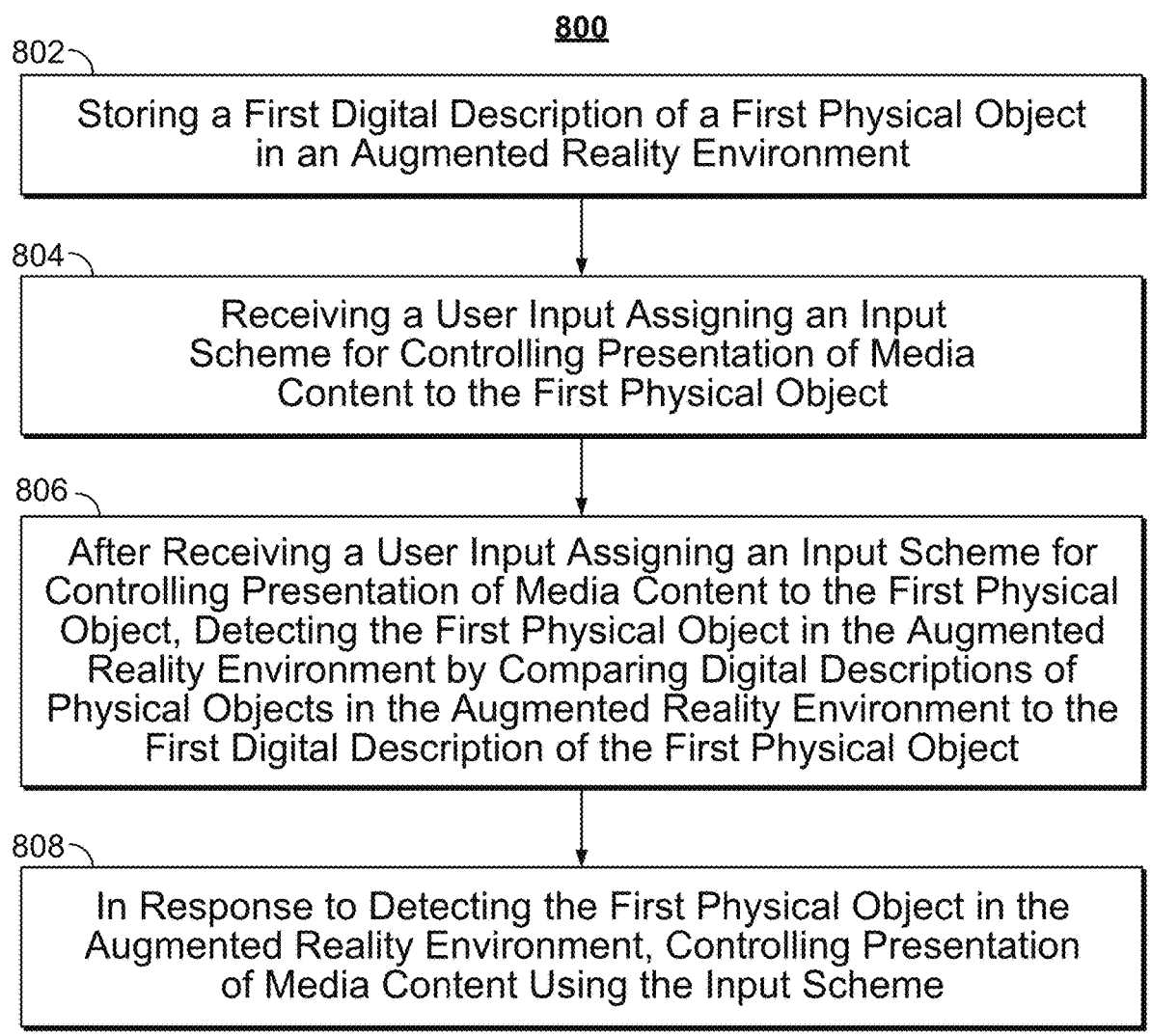
FIG. 8 is a flowchart of illustrative steps for associating an input scheme with a physical object and allowing a user to control presentation of media content with the physical object in accordance with some embodiments of the disclosure.

FIG. 8 is a flowchart of illustrative steps for associating an input scheme with a physical object and allowing a user to control presentation of media content with the physical object. It should be noted that process 800, or any step thereof, could occur on, or be provided by, any of the devices shown in FIGS. 5-6. For example, process 800 may be executed by control circuitry 504 (FIG. 5) as instructed by the media guidance application (e.g., implemented on any of the devices shown and described in FIG. 6).

In step 802, the media guidance application may store (e.g., in storage 508 (FIG. 5)) a digital description of a physical object in an augmented reality environment of a user. For example, the media guidance application may detect a water bottle in a user's augmented reality environment via a camera in the user's augmented reality headset. For example, the media guidance application may store a digital representation of an image of the water bottle in memory.

In step 804, the media guidance application receives (e.g., using control circuitry 506 (FIG. 5)) a user input (e.g., via user input interface 510 (FIG. 5)), from the user, assigning an input scheme for controlling presentation of media content (e.g., volume, playback speed) to the physical object. For example, the user may identify an input scheme to pause media content when drinking from the water bottle.

In some embodiments, the user input assigning an input scheme for controlling presentation of media content to the physical object is a combination of a voice input identifying an attribute of the presentation of media content to be controlled and a gesture input identifying the interaction with the physical object that controls the attribute. For example, the user may say, "pause," and, simultaneously, open a water bottle to indicate a desire to pause media content when the water bottle is opened.

In some embodiments, the media guidance application creates and stores a digital description of the gesture input identifying the interaction with the physical object. For example, the media guidance application may detect the gesture input in a video from the camera. The media guidance application may apply object recognition and motion detection to the video to create a digital description of the gesture input. For example, the media guidance application may determine a change in the position of the object in the video relative to other objects in the video. In another example, the media guidance application may determine a change in the position of parts of the object in the video relative to the object's center. The media guidance application may store the digital description of the gesture. For example, the media guidance application may store the digital description of the gesture in storage on the user's local device, or on a server.

In some embodiments, the attribute of presentation is selected by the user from a list of predefined attributes. For example, the media guidance application may generate for display a list of attributes (e.g., pause/play, volume, playback speed, brightness, etc.) from which the user may select one.

In some embodiments, the interaction with the physical object that controls the attribute is selected by the user from a list of predefined interactions. For example, the media guidance application may generate for display a list of interactions (e.g., touch, lift, knock-on, point, etc.) from which the user may select one.

In some embodiments, the input scheme for controlling presentation of media content is one of a plurality of predefined input schemes, each associated with a physical object. For example, when the media guidance application detects a yoga mat, it may display predefined input schemes associated with yoga mats. For example, the media guidance application may generate for display a list of predefined input schemes associated with yoga mats, including play media when unrolling yoga mat and pause media when rolling-up yoga mat.

In some embodiments, the media guidance application retrieves predefined input schemes associated with a physical object from a server, after storing a digital description of the physical object. For example, after storing the digital description of the exercise bike, the media guidance application may retrieve predefined input schemes associated with an exercise bike.

In some embodiments, the interaction with the physical object may be associated with navigating a digital library of media content. For example, the user may wish to associate peddling on an exercise bike with scrolling through a list of songs. For example, the user may scroll through the list of songs by peddling faster. For example, the media guidance application may detect the peddles on the exercise bike are rotating faster by applying motion detection to a video input of the bike and may scroll through the list of songs.

In step 806, the media guidance application, after receiving the user input assigning the input scheme for controlling presentation of media content to the physical object, detects (e.g., using control circuitry 506 (FIG. 5)) the physical object (e.g., exercise bike 106 (FIG. 1)) in the augmented reality environment by comparing digital descriptions of physical objects in the augmented reality environment to the digital description of the first object. For example, the media guidance application may detect the water bottle when it is present in the user's augmented reality environment by comparing descriptions of images of physical objects in the user's augmented reality with the stored digital description of the water bottle.

In step 808, the media guidance application, in response to detecting the physical object in the augmented reality environment, controls (e.g., using control circuitry 506 (FIG. 5)) presentation of media content using the input scheme. For example, the user may pause the media content by opening the water bottle.

In some embodiments, the media guidance application controls presentation of media content using the input scheme by monitoring the user's augmented reality environment for a user interaction with the physical object. For example, the media guidance application may continuously analyze a video input from the camera to detect a user interaction with the water bottle. For example, the media guidance application may apply object recognition and motion detection to the video input from the camera to detect the user's hand removing the bottle cap. The media guidance application may, in response to detecting a user interaction with the physical object, determine an input scheme that uses the user interaction. For example, the media guidance application may determine that opening the water bottle is part of an input scheme that pauses media content when the water bottle is opened. The media guidance application may change presentation of media content according to the input scheme. For example, when the user opens the water bottle, the media guidance application may pause the media content.

In some embodiments, the media guidance application may interface with a physical object. For example, the media guidance application may transmit and receive data from the physical object via a communications path (e.g., communications path 608, 610, 612 (FIG. 6)). The media guidance application may receive a user input from the physical object over a communications path. For example, a user may press a button on an exercise bike, and the exercise bike may transmit the user input to the user's device. In some embodiments, an input scheme may include receiving a user input from a physical object. For example, the user may assign the button on the exercise bike to increase the volume of the media content. When the user presses the button, the exercise bike may transmit the button press to the user's augmented reality headset, and the media guidance application may increase the volume.

In some embodiments, the media guidance application may detect a brand of a physical object. For example, the media guidance application may detect a logo on an exercise bike, identifying the brand of the exercise bike. The media guidance application may retrieve input schemes associated with physical objects of the brand. For example, the media guidance application may retrieve a list of buttons, knobs, switches, touch screens, or any other input devices available on physical objects of the brand. For example, the media guidance application may retrieve that there is a button on the exercise bike that may be used to pause/play media content, control the volume of media content, etc.

In some embodiments, physical objects of different brands have different digital descriptions. For example, an exercise bike of brand A may have a different alphanumeric value from an exercise bike of brand B.

Figure 9:
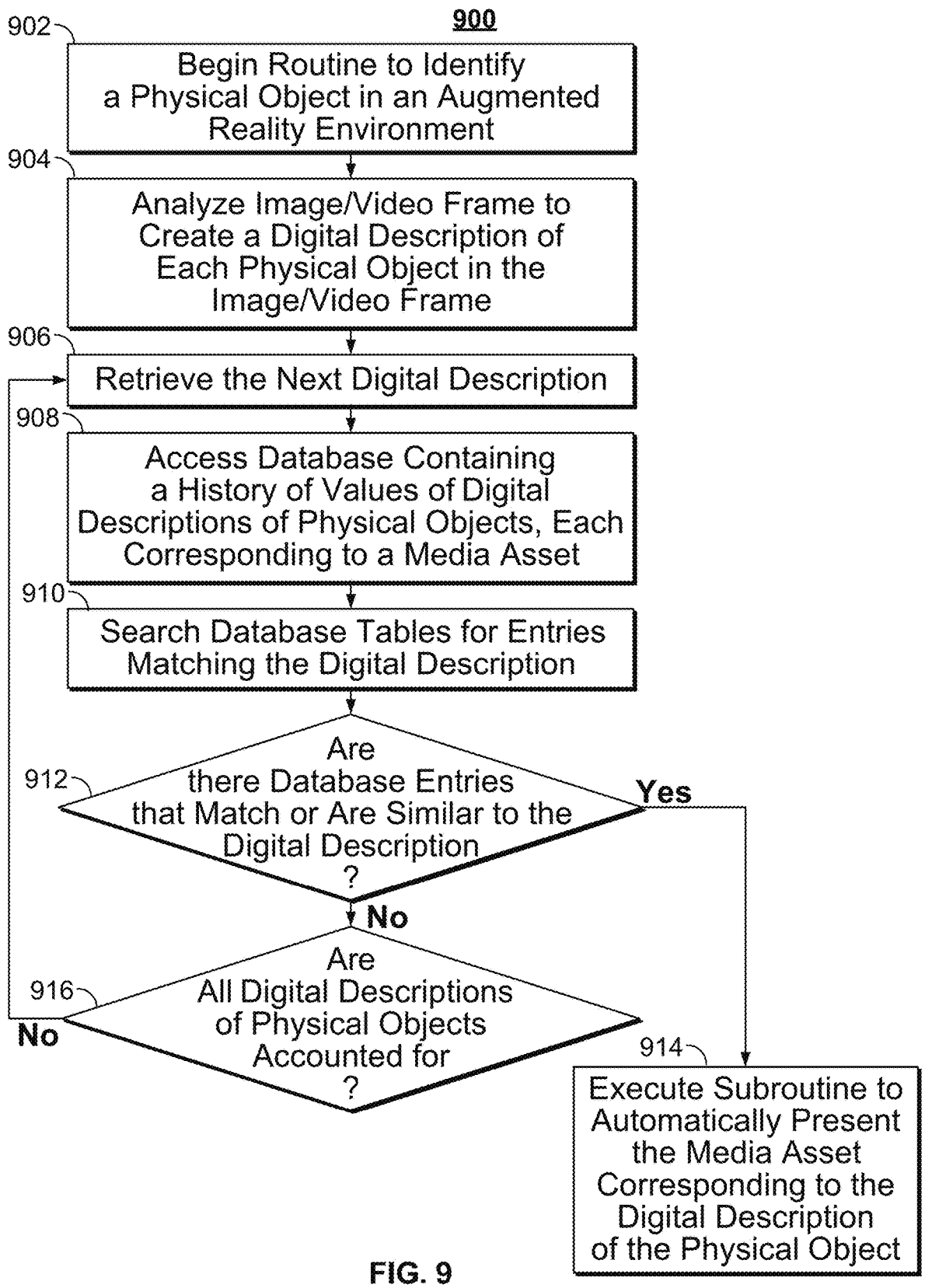
FIG. 9 is a flowchart of illustrative steps for identifying a physical object in an augmented reality environment in accordance with some embodiments of the disclosure.

FIGS. 9 and 10 present processes implemented on control circuitry (e.g., control circuitry 504) to identify a physical object in an augmented reality environment using a database containing a history of digital descriptions of physical objects, each corresponding to a media asset in accordance with some embodiments of the disclosure. In some embodiments this process may be encoded on to non-transitory storage medium (e.g., storage device 508) as a set of instructions to be decoded and executed by processing circuitry (e.g., processing circuitry 506). Processing circuitry may in turn provide instructions to other sub-circuits contained within control circuitry 504, such as the tuning, video generating, encoding, decoding, encrypting, decrypting, scaling, analog/digital conversion circuitry, and the like.

The flowchart in FIG. 9 describes a process implemented on control circuitry (e.g., control circuitry 504) to search a database, identify a physical object in an augmented reality environment, and automatically present a media asset associated with the physical object in accordance with some embodiments of the disclosure.

At step 902, control circuitry 504 will begin to search a database and identify a physical object in an augmented reality environment. In some embodiments, this may be done either directly or indirectly in response to a user action or input (e.g., from signals received by control circuitry 504 or user input interface 510).

At step 904, control circuitry 504 proceeds to analyze an image/video frame to create a digital description of each physical object in the image/video frame.

At step 906, control circuitry 504 proceeds to retrieve the next digital description of a physical object from stored memory. In some embodiments control circuitry 504 may retrieve a single primitive data structure that represents the value of the digital description. In some embodiments control circuitry 504 may retrieve the value from a larger class or data structure.

At step 908, control circuitry 504 accesses a database containing a history of values of digital descriptions. In some embodiments, this database may be stored locally (e.g., on storage device 508) prior to beginning the algorithm. In some embodiments the database may also be accessed by using communications circuitry to transmit information across a communications network (e.g., communications network 614) to a database implemented on a remote storage device (e.g., media guidance data source 618).

At step 910, control circuitry 504 searches database tables for entries matching the digital description of the physical object. In some embodiments this may be done by comparing an identifier, for example a string, integer, or alphanumeric value representing the digital description, that matches the types of identifiers used inside the database. In some embodiments control circuitry 504 may submit a general query to the database for table entries matching the digital description of the physical object, and control circuitry 504 may receive a list of indices or a data structure containing a portion of the database contents. In some embodiments the database may implement a junction table that in turn cross-references entries from other databases. In this case, control circuitry 504 may retrieve indices from a first database that in turn can be used to retrieve information from a second database. Although we may describe control circuitry 504 interacting with a single database for purposes of clarity, it is understood that the algorithm of FIG. 9 may be implemented using multiple independent or cross-referenced databases.

At step 912, control circuitry 504 determines if there are database entries that match or are similar to the digital description. In some embodiments control circuitry 504 may receive a signal from the database indicating that there are no matching entries. In some embodiments control circuitry 504 may instead receive a list of indices or data structures with a NULL or dummy value. If control circuitry 504 identifies that there are database entries that match or are similar to the digital description the algorithm proceeds to step 914, otherwise the algorithm proceeds to step 916.

At step 914, control circuitry 504 executes a subroutine to automatically present the media asset corresponding to the digital description of the physical object.

At step 916, control circuitry 504 determines if all digital descriptions are accounted for and if further iterations are needed. If further iterations are needed the algorithm will loop back to step 906 where control circuitry 504 will retrieve the next digital description.

It is contemplated that the descriptions of FIG. 9 may be used with any other embodiment of this disclosure. In addition, the descriptions described in relation to process 900 of FIG. 9 may be done in alternative orders or in parallel to further the purposes of this disclosure. For example, control circuitry 504 may submit multiple queries to the database in parallel, or it may submit multiple queries to a plurality of similar databases in order to reduce lag and speed the execution of process 900. To further this purpose, in some embodiments step 912 may be performed in parallel by control circuitry 504. Furthermore, it should be noted that the process of FIG. 9 may be implemented on a combination of appropriately configured software and hardware, and that any of the devices or equipment discussed in relation to FIGS. 5-6 could be used to implement one or more portions of the algorithm.

The pseudocode in FIG. 10 describes a process to identify a physical object in an augmented reality environment and automatically present a media asset that is associated with the physical object in accordance with some embodiments of the disclosure. It will be evident to one skilled in the art that process 1000 described by the pseudocode in FIG. 10 may be implemented in any number of programming languages and on a variety of different hardware, and that the style and format should not be construed as limiting, but rather as a general template of the steps and procedures that would be consistent with code used to implement some embodiments of this disclosure.

At line 1001, control circuitry 504 runs a subroutine to initialize variables and prepare to identify a physical object in an augmented reality environment, which begins on line 1005. For example, in some embodiments control circuitry 504 may copy instructions from a non-transitory storage medium (e.g., storage device 508) into RAM or into the cache for processing circuitry 506 during the initialization stage.

Line 1003 includes a comment describing the purpose of the subroutine. In some embodiments, control circuitry 504 ignores the comment. In some embodiments, the comment is at the top of the code or on any other line in the code. In some embodiments, the comment is more specific by describing the purpose of specific variables and lines in the code. In some embodiments, the comment is missing entirely.

At line 1005, control circuitry 504 analyzes an image/video frame to create a digital description of each physical object in the image/video frame. In some embodiments, this image/video frame may be retrieved from a camera input.

At line 1006, control circuitry 504 iterates through the various digital descriptions; if only a single instance is available, the loop will execute only once. This loop may be implemented in multiple fashions depending on the choice of hardware and software language used to implement the algorithm of FIG. 10; for example, this may be implemented as part of a "for" or "while" loop, in some programming languages. In some embodiments it may be convenient to store the digital descriptions in a single class or encapsulated data structure that will perform the loop as part of an internal method.

At line 1007, control circuitry 504 queries a database for entries matching the digital description. Depending on how the database is implemented and how the digital description is stored, an intermittent step may be required to convert the digital description into a form consistent with the database. For example, the digital description may be encoded into a string, an integer, or an alphanumeric value using an appropriate hashing algorithm prior to being transmitted to the database by control circuitry 504 as part of a query. In some embodiments, the digital description may be encoded as a primitive data structure, and control circuitry 504 may submit the digital description as a query to the database directly. After querying the database, control circuitry 504 may receive a set of database entries that match or are similar to the digital description. In some embodiments, control circuitry 504 may receive these entries in the form of a data structure, a set of indices of the database, or a set of indices of another cross-referenced database.

At line 1008, control circuitry 504 will determine if there are any database entries that match or are similar to the digital description. In some embodiments control circuitry 504 may determine this by checking if the database returned an empty data structure or a NULL value in response to the query in line 1007. If there are matching database entries the algorithm may proceed to line 1009. If there were no matching database entries and there are more digital descriptions to process, the algorithm may instead proceed to the next iteration of the loop.

At line 1009, control circuitry 504 retrieves one or more values of media assets from the database entries matching the digital description. For example, if control circuitry 504 retrieves a list of indices after querying the database in line 1007, in some embodiments control circuitry 504 may retrieve the database entries for media assets located at the received indices. In some embodiments the indices may point to a larger data structure contained within the database, and control circuitry 504 may retrieve the values of the media assets from within the data structure using appropriate accessor methods. In some embodiments control circuitry 504 may retrieve the values of media assets and store them in a separate data structure locally (e.g., in storage 509) prior to proceeding further. After retrieving the values of the media assets, the algorithm will proceed to line 1010.

At line 1010, control circuitry 504 executes a subroutine to use the values of the media assets and automatically present the media assets corresponding to the digital description of the physical object using control circuitry. Afterwards, the algorithm may proceed to the termination subroutine at line 1012.

At line 1012, control circuitry 504 executes a termination subroutine after the algorithm has performed its function and all digital descriptions have been processed and checked against the database. For example, in some embodiments control circuitry 504 may destruct variables, perform garbage collection, free memory or clear the cache of processing circuitry 506.

It will be evident to one skilled in the art that process 1000 described by the pseudocode in FIG. 10 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be re-written so control circuitry 504 is instructed to evaluate multiple digital descriptions and submit multiple database queries simultaneously using a plurality of processors or processor threads. It is also understood that although we may describe control circuitry 504 interacting with a single database, this is only a single embodiment described for illustrative purposes, and the algorithm of FIG. 10 may be implemented using multiple independent or cross-referenced databases. For example, a database stored locally (e.g., on storage 508) may index or cross-reference a database stored remotely (e.g., media guidance data source 618), which may be accessible through any number of communication channels (e.g., communications network 614). In some embodiments, this may allow control circuitry 504 to utilize a look-up table or database front-end efficiently stored on a small local drive to access a larger database stored on a remote server on demand.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for controlling of media content with physical world objects, the method comprising:
storing digital descriptions of a plurality of physical objects in an augmented reality environment of a user;
receiving a user input from the user assigning a media asset to a first physical object separate from the user of the plurality of physical objects;
detecting the first physical object and a second physical object separate from the user of the plurality of physical object in the augmented reality environment by comparing digital descriptions of physical objects in the augmented reality environment to the digital description of the first physical object and to the digital description of the second physical object;
in response to identifying user interaction with the second physical object after user interaction with the first physical object in the augmented reality environment, reassigning the media asset from the first physical object to the second physical object.

2. The method of claim 1 further comprising identifying the first physical object by detecting a first hand gesture over the first physical object.

3. The method of claim 2 further comprising identifying the second physical object by detecting a second hand gesture over the second physical object, wherein the second hand gesture is different from the first hand gesture.

4. The method of claim 1 further comprising initially identifying initially the first physical object by detecting a hand gesture over the first physical object followed by identifying the second physical object by detecting the hand gesture over the second physical object.

5. The method of claim 1, wherein the user input assigning the media asset to the first physical object is a voice input identifying the media asset.

6. The method of claim 1 wherein reassigning the media asset comprises receiving another user input assigning the media asset to the second physical object.

7. The method of claim 1 further comprising in response to detecting the first physical object, automatically causing the media asset to be presented.

8. The method of claim 1 further comprising receiving another input controlling presentation of the media asset.

9. The method of claim 1 wherein storing digital descriptions of the plurality of physical objects in the augmented reality environment comprises:
creating an object identifier associated with the respective physical object; and
storing the object identifier and the first digital description in a database listing object identifiers, each corresponding to a digital description.

10. The method of claim 9 further comprising storing a media asset identifier associated with the media asset and the object identifier in a database listing object identifiers, each corresponding to a media asset.

11. A system for controlling of media content with physical world objects, the system comprising:
storage circuitry configure to store digital descriptions of a plurality of physical objects in an augmented reality environment of a user;
an input/output circuitry configured to receive a user input from the user assigning a media asset to a first physical object separate from the user of the plurality of physical objects;
a control circuitry configured to:
detect the first physical object and a second physical object separate from the user of the plurality of physical object in the augmented reality environment by comparing digital descriptions of physical objects in the augmented reality environment to the digital description of the first physical object and to the digital description of the second physical object;

in response to identifying user interaction with the second physical object after user interaction with the first physical object in the augmented reality environment, reassign the media asset from the first physical object to the second physical object.

12. The system of claim 11 wherein the control circuitry is further configured to identify the first physical object by detecting a first hand gesture over the first physical object.

13. The system of claim 12 wherein the control circuitry is further configured to identify the second physical object by detecting a second hand gesture over the second physical object, wherein the second hand gesture is different from the first hand gesture.

14. The system of claim 11 wherein the control circuitry is further configured to initially identify the first physical object by detecting a hand gesture over the first physical object followed by identifying the second physical object by detecting the hand gesture over the second physical object.

15. The system of claim 11, wherein the user input assigning the media asset to the first physical object is a voice input identifying the media asset.

16. The system of claim 11 wherein to reassign the media asset, the control circuitry is further configured to receive another user input assigning the media asset to the second physical object.

17. The system of claim 11 wherein the control circuitry is further configured to automatically cause the media asset to be presented in response to detecting the first physical object.

18. The system of claim 11 wherein the control circuitry is further configured to receive another input controlling presentation of the media asset.

19. The system of claim 11 wherein to store digital descriptions of a plurality of physical objects in the augmented reality environment, the control circuitry is further configured to:

create an object identifier associated with the respective physical object; and store the object identifier and the first digital description in a database listing object identifiers, each corresponding to a digital description.

20. The system of claim 19 wherein the control circuitry is further configured to store a media asset identifier associated with the media asset and the object identifier in a database listing object identifiers, each corresponding to a media asset.

* * * * *